United States Patent
Ohta

(10) Patent No.: US 6,897,893 B1
(45) Date of Patent: May 24, 2005

(54) IMAGE PICKUP DEVICE EQUIPPED WITH LIGHT EMITTER AND IMAGE PICKUP METHOD USING THE SAME

(75) Inventor: Seiichi Ohta, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/286,791

(22) Filed: Apr. 6, 1999

(30) Foreign Application Priority Data

Apr. 9, 1998 (JP) .......................................... 10-114313

(51) Int. Cl.⁷ ........................ H04N 5/228; H04N 5/222
(52) U.S. Cl. ................................. 348/222.1; 348/371
(58) Field of Search .......................... 348/221.1, 222.1, 348/223.1, 224.1, 362, 363, 371, 364

(56) References Cited

U.S. PATENT DOCUMENTS

| | | | |
|---|---|---|---|
| 4,954,897 A | | 9/1990 | Ejima et al. |
| 5,019,911 A | * | 5/1991 | Okino et al. ................. 348/364 |
| 5,504,584 A | | 4/1996 | Soeda |
| 5,682,201 A | * | 10/1997 | Ogawa ..................... 348/224.1 |
| 5,808,681 A | * | 9/1998 | Kitajima .................... 348/371 |
| 6,075,562 A | * | 6/2000 | Sakaguchi et al. ........ 348/223.1 |
| 6,278,490 B1 | * | 8/2001 | Fukuda et al. .............. 348/362 |
| 6,426,775 B1 | * | 7/2002 | Kurokawa ................... 348/363 |

FOREIGN PATENT DOCUMENTS

| | | | |
|---|---|---|---|
| EP | 0 773 469 | 5/1997 | |
| JP | 5-44654 | 7/1993 | |
| JP | 07-015655 | * 1/1995 | .......... H04N/5/238 |
| WO | 97/36427 | 2/1997 | |

* cited by examiner

Primary Examiner—Wendy R. Garber
Assistant Examiner—Luong T. Nguyen
(74) Attorney, Agent, or Firm—Frishauf, Holtz, Goodman & Chick, P.C.

(57) ABSTRACT

When a shutter button is depressed after a stroboscopic image pickup mode is set, an image pickup unit determines a pre-light emission quantity and sends a light emission quantity control pulse to a strobe light emitter to make it carry out a pre-light emission. Then, the image pickup unit detects a light quantity of a picked-up image of an object at the time of the strobe light emission, and determines whether the light quantity is proper or not as the image pickup light quantity. If the light quantity of the image of the object picked up by the pre-light emission is within a range of proper values, the taken-in image is recorded as a photographed image. On the other hand, if the light quantity is not proper, a light quantity necessary for the image pickup is determined based on the light quantity of the taken-in image of the object and makes a strobe carry out a main light emission. Then, the image picked up by the main light emission is taken in and this is recorded as a photographed image. Accordingly, if the light quantity of an image of the object picked up by the pre-light emission is within a range of proper values, it is not necessary to carry out an additional light emission or an image pickup operation.

12 Claims, 8 Drawing Sheets

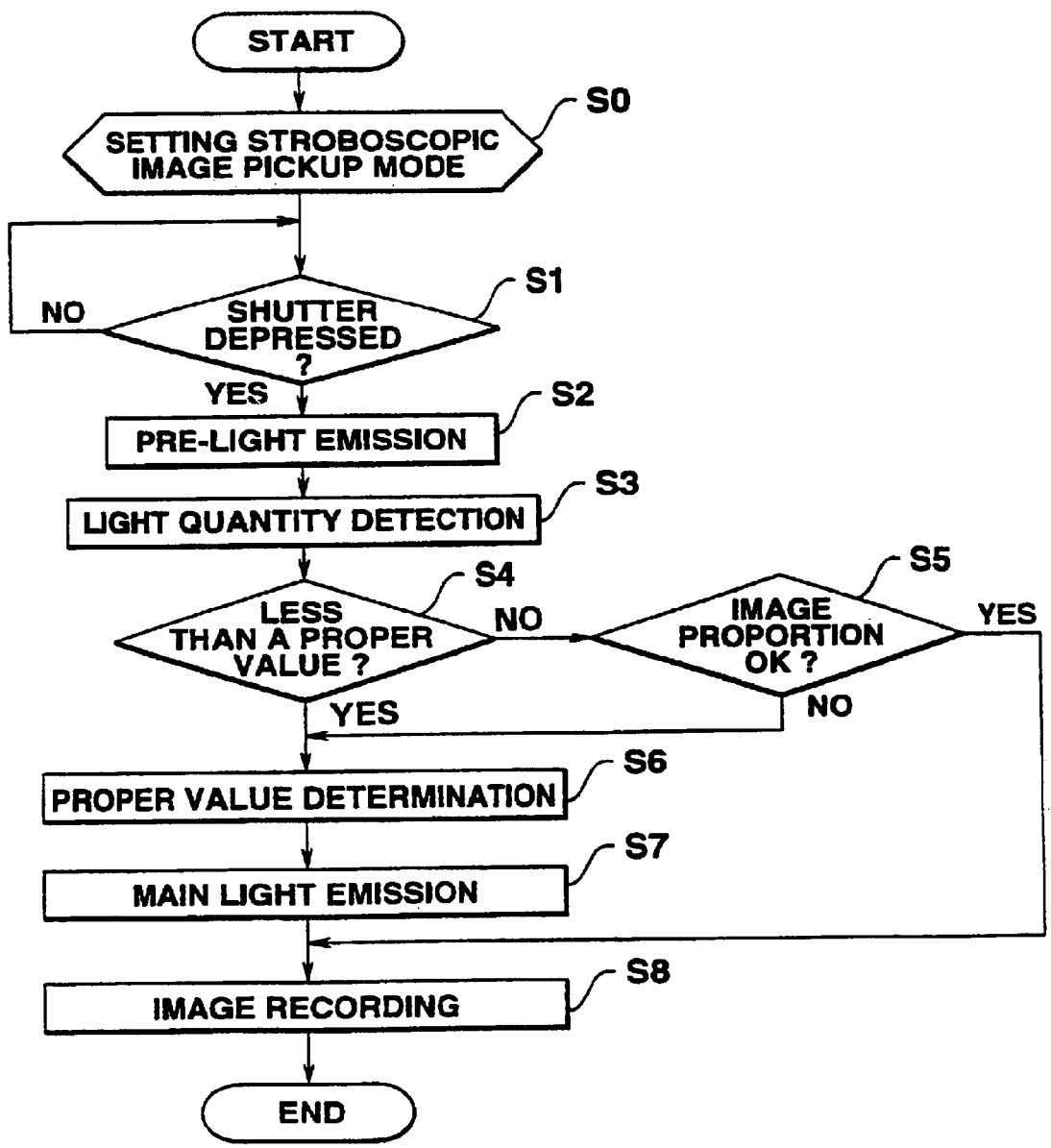

IMAGE PICKUP DEVICE EQUIPPED WITH LIGHT EMITTER AND IMAGE PICKUP METHOD USING THE SAME

BACKGROUND OF THE INVENTION

The present invention relates to an image pickup device equipped with a light emitter and an image pickup method using a light emitter.

For taking a picture or carrying out an image pickup operation in a place with insufficient light quantity, it has been a common practice that the image is picked up by extending an exposure time or by compensating the light quantity by emitting light with a strobe or an electronic flash. In the latter case, the use of the strobe can shorten the exposure time and it becomes possible to take a picture without setting a camera to a fixed place even in the dark.

As one of photographing techniques based on a stroboscopic light emission, there is available a strobe control technique as disclosed in Jpn. Pat. Appln. KOKAI Publication No. 5-44654. According to this method, for carrying out a stroboscopic photographing, a pre-light emission is carried out first, and then a main light emission is carried out by controlling the quantity of the light emission with reference to image data stored at the time of the pre-light emission.

However, according to the above technique disclosed in Jpn. Pat. Appln. KOKAI Publication No. 5-44654, the main light emission is carried out without exception after the pre-light emission. Therefore, even if the light quantity of an image obtained by the pre-light emission is sufficiently suitable, for example, a photographing is achieved through the main light emission, despite a fact that the image obtained by the pre-light emission could have been used as a picked-up image. This requires a charging to a capacitor for carrying out the main light emission. Thus, there has been a wasting of power by this charged amount, which results in a shorter life of a battery.

BRIEF SUMMARY OF THE INVENTION

An object of the present invention is to provide an image pickup device equipped with a light emitter and an image pickup method using the same which can reduce the number of light emission in higher probabilities and prolong the life of a battery.

According to one preferred aspect of the present invention, there is provided an image pickup device equipped with a light emitter, comprising: an image pickup unit for picking up an image and converting the picked-up image into an electric signal; a memory for storing data electrically converted by the image pickup unit; a determining section for making a determination of whether the electric signal converted by the image pickup unit has a proper brightness or not; a controller for making the electric signal converted by the image pickup unit to be stored in the memory if a result of the determination of the determining section is "proper"; and a light emitter for being controlled by the controller to emit light in timing with an image pickup timing of the image pickup device.

Further, according to another preferred aspect of the invention, there is provided an image pickup device equipped with a strobe, comprising: an image pickup unit which comprises a charge couple device (CCD), for picking an image of an object and converting this image into an electric signal; a memory for storing data electrically converted by the image pickup unit; a determining section in a CPU for making a determination of whether the electric signal converted by the image pickup unit has a proper brightness or not; a controller in the CPU for making the electric signal converted by the image pickup unit to be stored in the memory if a result of the determining section is "proper", and, if a result of the decision of the determining section is "not proper", for obtaining a light quantity of a light emitter which is assumed to be "proper" based on the electric signal converted by the image pickup unit and for dispatching an image pickup instruction again to the image pickup unit, and at the same time, for controlling the light emitter to emit light in timing with the image pickup timing; and a stroboscopic light emitter for being controlled by the controller to emit light of a desired light-emission quantity in timing with an image pickup timing of the image pickup device.

Further, according to still another preferred aspect of the invention, there is provided an image pickup method using a light emitter, comprising the steps of: carrying out a first light emission of a light emitter, and carrying out a first image pickup in timing with this light emission; determining a brightness of a state of a picked-up image obtained by the image pickup operation; storing the content of the first picked-up image if a result of the determination is "at or above a predetermined value"; determining a second light emission value of the light emitter if a result of the determination is "less than a predetermined value"; carrying out a second light emission of the light emitter based on the second light emission value, and carrying out a second image pickup in timing with this light emission; and storing the content of the second picked-up image.

According to the above-described aspects, if the light quantity of an object photographed by the pre-light emission for determining the quantity of the main light emission is within a range of proper light quantity, the image obtained by the pre-light emission is recorded. Therefore, the number of light emission can be reduced, and the life of the battery can also be extended.

Further, according to still another preferred aspect of the invention, there is provided an image pickup device equipped with a light emitter, comprising: an image pickup unit for picking up an image and converting the picked-up image into an electric signal; a memory for storing data electrically converted by the image pickup unit; a determining section for making a determination of whether the electric signal converted by the image pickup unit has a proper brightness or not; a controller for making the electric signal converted by the image pickup unit to be stored in the memory if a result of the determination of the determining section is "proper"; a light emitter for being controlled by the controller to emit light in timing with an image pickup timing of the image pickup device; and an auto-focussing unit for driving an optical system to focus on an object.

According to the above aspect, the light quantity of a pre-light emission is determined based on a distance from an image pickup object obtained by an auto-focussing operation, and an image obtained by the pre-light emission is recorded if the light quantity of the object is within a range of proper light quantity. Therefore, the number of light emission can be reduced in higher probabilities, and thus the life of a battery can be made longer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a flowchart for showing an example of the operation of a digital camera in a stroboscopic image pick-up mode.

DETAILED DESCRIPTION OF THE INVENTION

An image pickup device according to the present invention is equipped with a strobe which makes it possible to carry out an image pickup operation in the dark. When a user depresses a shutter, the image pickup device performs a pre-light emission to determine whether light quantity of an image picked-up object is proper or not. If the light quantity is within a range of proper values, the taken-in image of the object is recorded and stored as a picked-up image.

On the other hand, if the light quantity is not proper, a light quantity necessary for image pickup is calculated based on the taken-in light quantity of the object to make the strobe to carry out a main light emission. The taken-in image is recorded as a photograph or a picked-up image.

Example of a Circuit Structure

Figure 1:
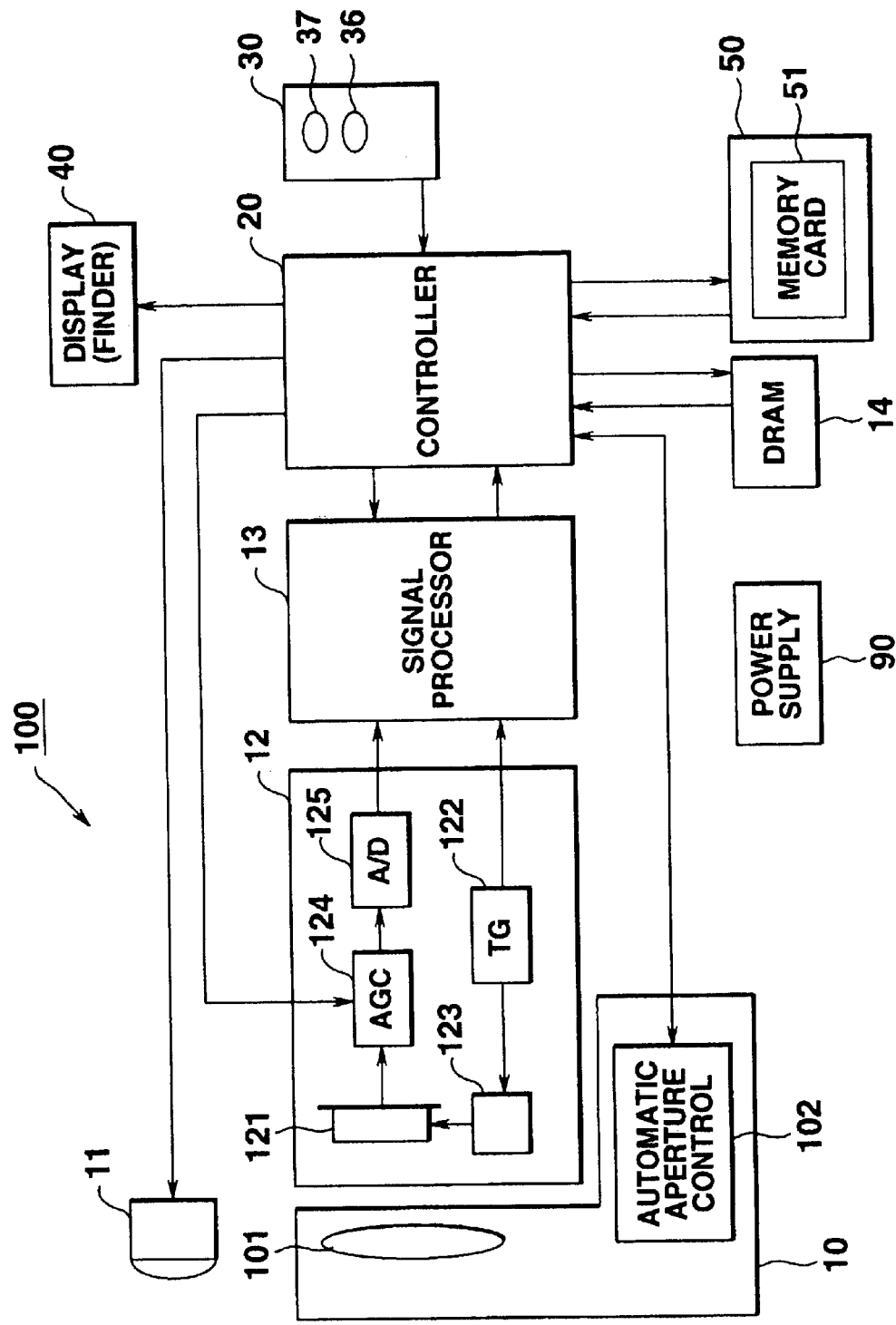
FIG. 1 is a block diagram for showing an example of the circuit structure of a digital camera as one embodiment of an image pickup device to which the present invention is applied.

FIG. 1 is a block diagram for showing an example of the circuit structure of a digital camera as one embodiment of an image pickup device to which the present invention is applied.

In FIG. 1, a digital camera 100 has an optical system 10, a stroboscopic light emitter 11, a signal converter 12, a signal processor 13, a DRAM 14, a controller 20, a console 30, a display 40, a recorder 50 and a power supply 90.

The optical system 10 is structured by an image pickup lens 101 and an automatic aperture control 102 having a light quantity detector, and makes a light flux of an image picked-up object focussed with light through the image pickup lens 101 to be formed as an image on a CCD 121 at a later stage.

The stroboscopic light emitter 11 discharges or emits a predetermined quantity of light within an extremely short period upon receiving a light-emission quantity control signal from the controller 20, and compensates the peripheral light quantity. The discharged light quantity, that is, a charged quantity to a stroboscopic light emission capacitor, is controlled by the light-emission quantity control signal.

The signal converter 12 includes a CCD 121, a CCD driving timing signal generating circuit (TG) 122, a CCD driving vertical driver 123, an automatic gain control circuit (AGC) 124, and an A/D converter 125. The signal converter 12 converts an image formed on the CCD 121 through the optical system 10 of the first stage, into an electric signal, then into digital data (hereinafter to be referred to as image data), and outputs one frame in a constant period. The AGC 124 gain adjusts a signal from the CCD 121 by the control of the controller 20 and applies the gain-adjusted signal to the A/D converter 125.

The signal processor 13 has a color process circuit and a DMA controller. The signal processor 13 processes the colors of an output from the signal converter 12, to prepare a digital luminance and color difference multiplex signal (YUV data), and direct memory access (DMA) transfers the YUV data to a designated area of the DRAM 14 and develops the data.

The signal processor 13 reads the YUV data written in the DRAM 14 at the time of recording and storing the data, and carries out a JPEG compression processing. The signal processor 13 also expands the image data stored in a recording medium (a memory card in the present embodiment) 51 read through the recorder 50 in a restoration mode, and restores the YUV data.

The controller 20 has a CPU, a RAM and a ROM. Without providing the RAM, an area allocated to the DRAM 14 may also be used instead of the RAM.

The controller 20 is connected to the above circuits and power supply change-over switches not shown, through bus lines, to carry out an overall control of the digital camera 100 based on a control program stored in the ROM, as well as to carry out an execution control of each function the digital camera corresponding to a status signal from the console 30, for example, an execution control of each mode processing by the execution of each mode processing unit stored in the ROM.

The console 30 has a processing mode change-over switch, a plurality of function selection buttons, a main switch, switches and buttons including an output button, a recording/restoration mode change-over switch, etc., a strobe setting (a stroboscopic image pickup mode selection) button 36, and a shutter button 37. When these switches and buttons are operated, a status signal is sent to the controller 20.

The display 40 is structured by a display unit such as a liquid crystal display unit or the like. Since a picked-up image is displayed on the screen during an image pickup operation, the screen can be used as a finder. A restored image can also be displayed during a restoration mode.

The recorder 50 accommodates a recording medium and records image data from the signal processor 13 on a recording medium 51 by the control from the controller 20. In the embodiment, the recorder 50 has the memory card 51 detachably structured as a recording medium, for writing and reading data. However, the recorder 50 may also be structured to have a recording medium such as a flash memory fixed inside, for writing and reading data.

Example of Appearance

Figure 2:
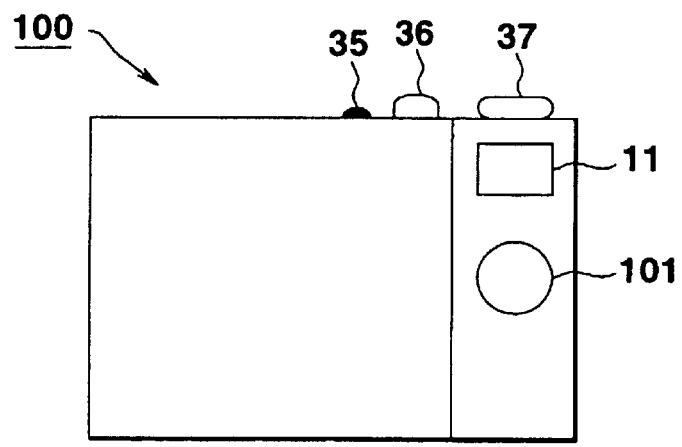
FIG. 2 is an appearance (front view) of the digital camera of the embodiment shown in FIG. 1.

FIG. 2 is an appearance (front view) of one embodiment of the digital camera 100. The stroboscopic light emitter 11 and the image pickup lens 101 are shown on the front surface of the digital camera 100. On the upper surface of the camera 100, there are shown a strobe charge status display lamp 35, the stroboscopic image pickup mode selection button 36 and the shutter button 37.

Processing Mode

The processing mode of the digital camera 100 is roughly classified into a normal mode including recording and restoration modes, and a special image pickup mode such as a close-contact image pickup or the like. By operating the processing mode change-over switch, either the normal operation mode or the special image pickup mode is obtained. By operating the recording/restoration mode change-over switch, either the recording mode or the restoration mode is obtained. The special image pickup mode also includes a recording mode and a restoration mode like the normal mode.

(The following explanation refers to the case of the normal mode. This similarly applies to the special image pickup mode.)

A shift to each mode by the change-over of each switch is effected by a user's operation of each mode setting (or mode selection) button or switch. Based on the operation of the mode setting button or the like, the controller 20 checks a status signal sent to the controller 20 from the console 30, and shifts to a corresponding mode processing circuit or program. A mode decision is carried out by a mode determining unit (structured by a program in the present embodiment).

[REC mode]

An REC mode includes a normal image pickup mode for displaying image data periodically taken in from the CCD 121 on the finder (liquid crystal display) 40 as a through image, a stroboscopic image pickup mode for picking up an image by a stroboscopic light emission, and a recording/storage mode for storing image data (YUV data) displayed from the DRAM 14 to the memory card 51 when a user depresses the shutter button 37 at a timing the image is wanted to be taken in while visually confirming the through image.

[Stroboscopic Image Pickup Mode]

When the stroboscopic image pickup mode is selected, the strobe is set and the strobe charge status display lamp is displayed in red color, a charge is applied to the strobe light emitter 11 from the power supply 90, and the charge is accumulated until the strobe light becomes ready to be emitted. When the strobe reaches a state that the light can be emitted, the strobe charge status display lamp 35 is turned on in green color.

In the stroboscopic image pickup mode, an optical image from the optical system 10 is converted into an electric signal by the CCD of the signal converter 12. The signal is then gain adjusted and is A/D converted. Then, color signal component and luminance component are taken out from the signal in the signal processor 13, and an image signal processing is carried out under the control of the controller 20.

When the shutter button 37 is depressed, the controller 20 starts a strobe controlling unit 110 to determine a stroboscopic light emission quantity, and transmits a light emission quantity control pulse to the strobe light emitter 11. After a stroboscopic light emission (pre-light emission), the controller 20 determines whether an increased light quantity of an image pickup object is proper or not, and then determines whether the mode shifts to the recording/storage mode or a re-light emission (main light emission) control is to be carried out.

More specifically, when a user has carried out a shutter operation at a desired angle, a pre-light emission is carried out at first to take in an image of the object (FIG. 4) and a determination is made whether the light quantity of the image is proper or not. If the light quantity of the object increased by the pre-light emission is within a range of proper values (FIG. 5A), the mode shifts to the recording/storage mode for storing the taken-in image of the object as a photographed image. On the other hand, if the light quantity is not proper (FIGS. 5B and 5C), a light quantity necessary for an image pickup is calculated based on the taken-in light quantity of the object, and the strobe is made to carry out the main light emission. The image of the object based on the main light emission is taken in.

The strobe light emitter 11 receives a light emission quantity control pulse, and carries out a light emission based on the light quantity determined by this pulse.

[Recording/Storage Mode]

When the shutter button 37 is depressed in the normal image pickup mode, the recording/storage mode is obtained, and an image displayed in the finder 40 at this time becomes a still image. Then, the content of the image buffer is JPEG compressed and is recorded in the memory card 51.

On the other hand, when the shutter button 37 is depressed in the stroboscopic image pickup mode, at first a determination is made as to whether the light quantity of the object obtained by the pre-light emission is proper or not. If the light quantity of the object is within a range of proper values, the image of the taken-in object is recorded in the memory card 51 as a photographed image. On the other hand, if the light quantity of the object is not proper, an image of the object taken in by the strobe main light emission is recorded in the memory card 51.

Embodiment 1-1

[STROBOSCOPIC Image Pickup Unit]

When a user has depressed the strobe setting button 36, the stroboscopic image pickup unit 110 is started and executes a stroboscopic image pickup processing and a recording/storage processing.

Figure 3:
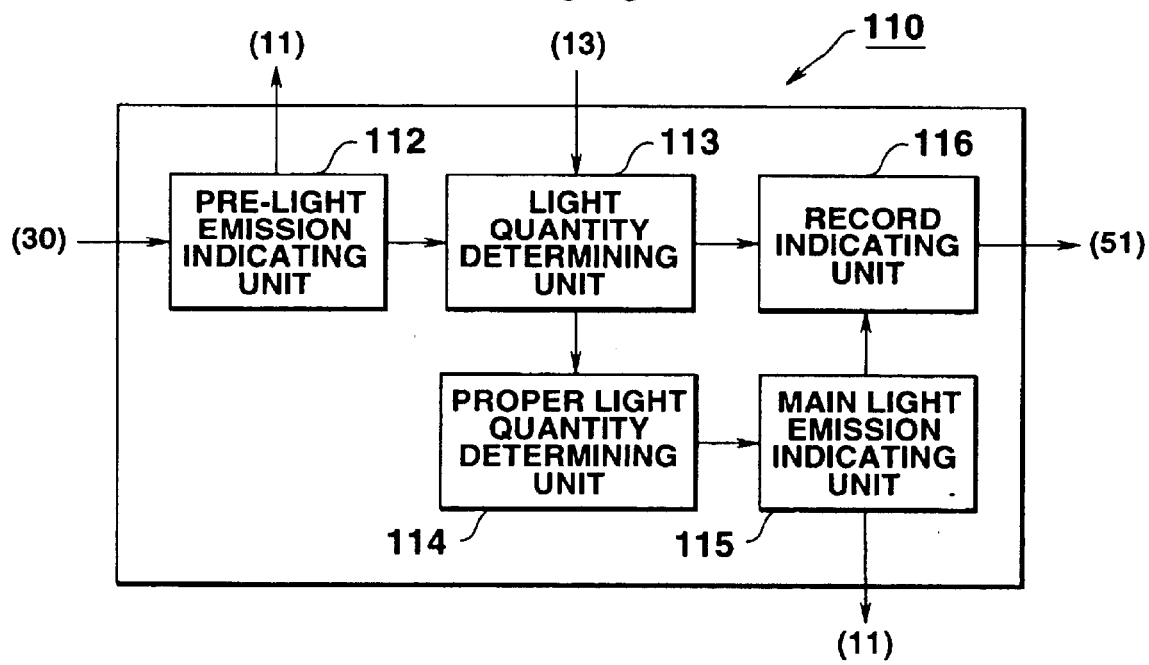
FIG. 3 is a block diagram for showing an example of the configuration of a stroboscopic image pickup unit.

FIG. 3 is a block diagram for showing an example of the configuration of the stroboscopic image pickup unit 110. The stroboscopic image pickup unit 110 includes a pre-light emission indicating unit 112, a light quantity determining unit 113, a proper light quantity determining unit 114, a main light emission indicating unit 115 and a recording indicating unit 116. These units are structured by hardware or software (program) (they are structured by a program in the present embodiment).

When the mode is in the stroboscopic image pickup mode, the pre-light emission indicating unit 112 waits for a depression of the shutter button 37. When the shutter button 37 has been depressed, a light emission quantity control signal for effecting a light emission in a predetermined pre-light emission quantity is sent to the strobe light emitter 11. The pre-light emission quantity is smaller than the main light emission quantity in the present embodiment, but this may be a larger quantity (reference embodiment 1-2).

Figure 5A:
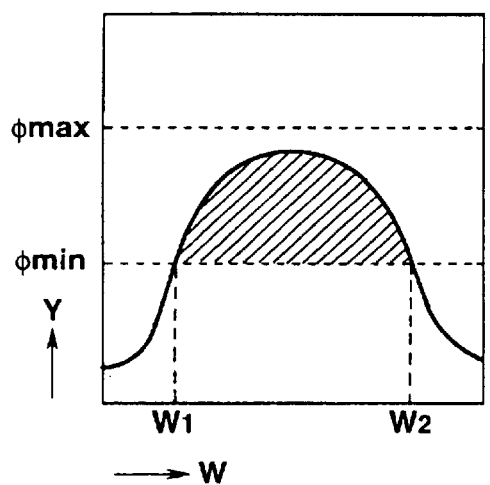
FIGS. 5A to 5D are explanatory diagrams for showing examples of light quantity distribution according to a stroboscopic image pickup.
Figure 5B:
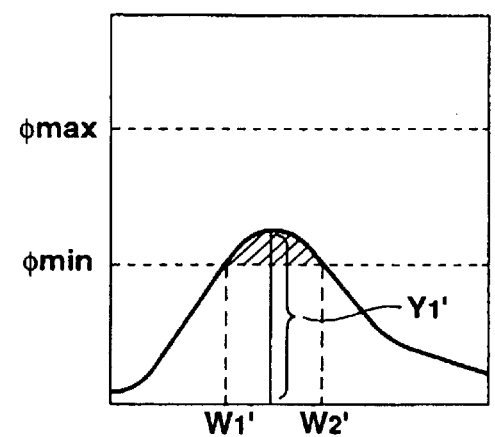
Figure 5C:
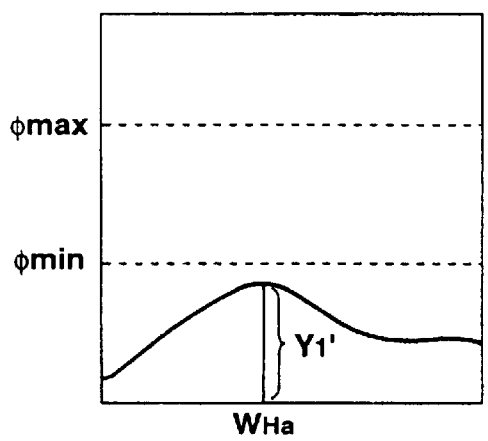
Figure 5D:
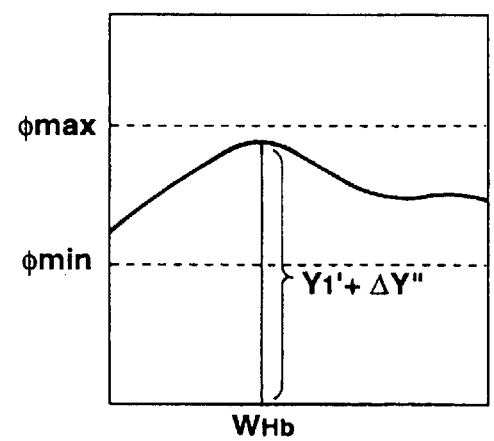

The light quantity determining unit 113 determines whether a light quantity detected value of an image of an object taken in at the time of a pre-light emission and stored in the DRAM 14 is within a range of proper values (within a range from a lower limit φ min to an upper limit φ max of proper light quantity (FIGS. 5A to 5C). If the light quantity values in all the areas of the image are less than the lower limit φ min (FIG. 5C) or if the light quantity in at least a predetermined proportion of the area of the image is not within the range of proper values (FIG. 5B), the proper light quantity determining unit 114 is used next. If the light quantity in at least a predetermined proportion of the area of the image is within the range of proper values (within the range from the lower limit φ min to the upper limit φ max (FIG. 5A), the image recording indicating unit 116 is used next.

When the light quantity determining unit 113 has determined that the light quantity of the object at the time of the pre-light emission is less than the lower limit φ min (FIG. 5C) or the light quantity in at least a predetermined proportion of the area of the image is not within the range of proper values, the proper light quantity determining unit 114 determines a light quantity (stroboscopic light emission quantity) so that the light quantity in at least a predetermined proportion of the area of the image becomes within a range of proper light quantity, and the step shifts to the main light emission indicating unit 115.

As an example of the determining method, when a width of one sheet covering an image is W, in the case where a light quantity Y in the range of w1 to w2 in FIG. 5A is within a range of proper values, a total light quantity Y is given as follows:

$$Y = \int_{w1}^{w2} y\, dy$$

Therefore, w1 and w2 are determined to have a relationship of φ min<Y<φ max. If a rate of the total light quantity Y is determined in advance, it is possible to obtain w1 and w2 from a normal distribution curve around a center object (a person 1 in the example of FIG. 4).

Accordingly, if the light quantity is not less than an optimum value like FIGS. 5B and 5C, w1 and w2 are determined to have a relationship of φ min<Y<φ max when a maximum value in the obtained light quantity is Y1. An increment of the maximum value Y1 in this case, that is, a sum of Y−Y1=ΔY" and a light emission light quantity ΔY' at the time of pre-light emission (ΔY=ΔY'+ΔY") becomes the total light quantity to be given to the strobe light emitter 11 when the main light emission indication is given.

When the proper light emission quantity determining unit 114 is shifted to the main light emission indicating unit 115, the main light emission indicating unit 115 sends a light emission quantity control signal for effecting a strobe light emission of the light quantity value ΔY obtained from the proper light quantity determining unit 114, to the strobe light emitter 11 to make it carry out the main light emission.

When the light quantity determining unit 113 is shifted to the record indicating unit 116 or at the time of a main light emission, the record indicating unit 116 sends an indication signal for effecting a reading of image data stored in the image buffer of the DRAM 14, a data compression and a transfer of the data to the flash memory 51, and makes the image data to be recorded.

Figure 4:
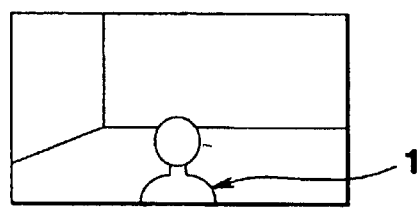
FIG. 4 is a view for showing one example of an image pickup object.

FIG. 4 is an explanatory view for showing one example of an image pickup object, and FIG. 5 is an explanatory diagram for showing an example of light quantity distribution according to a stroboscopic image pickup based on the example of the object in FIG. 4. FIG. 5A shows an example of a case where at least a predetermined proportion of the image is within a range of proper light quantity, FIG. 5B shows an example of a case where a part of the image is within a range of proper light quantity but a major part of the image is with less than proper light quantity, FIG. 5C shows an example of a case where the whole image has less than proper light quantity, and FIG. 5D shows a case where the example of FIG. 5C is compensated with the light quantity increment ΔY" calculated by the proper light quantity determining unit 114 and the whole image is accommodated within a range of proper light quantity.

[Example of Operation]

FIG. 6 is a flowchart for showing an example of an operation of a digital camera in the stroboscopic image pickup mode. The operation will be explained with reference to FIG. 1 to FIG. 6.

In FIG. 6, when the REC mode has been selected, the mode shifts to the image pickup mode and a through image is displayed in the finder 40. In this case, if a user decides from the brightness of the circumference that a stroboscopic image pickup is necessary or if the user desires a stroboscopic image pickup judging from the brightness of the screen by looking at the finder 40, the user depresses the strobe setting button 36. Then, the stroboscopic image pickup unit 110 is started and the strobe display lamp 35 is turned on, and the step goes to S1. The strobe display lamp 35 is turned on in red color in a strobe charged status, and is turned on in blue color in a strobe light emittable status. When the strobe setting button 36 is depressed again, the strobe display lamp 35 is turned off, and the processing by the stroboscopic image pickup/recording unit 110 is stopped to return to the normal image pickup mode (S0).

Next, the controller 20 checks a status signal from the console 30, and when the user has depressed the shutter button 37 at a subsequent desired timing (S1), the controller 20 sends a light quantity control signal for pre-light emission to the strobe light emitter 11 to make it carry out the pre-light emission to compensate the circumferential light quantity (S2).

The controller 20 detects the light quantity of the object of the image data taken in at the time of the pre-light emission (S3), compares the light quantity detected value with the lower limit value φ min of proper light quantity. If the maximum detected light quantity is at least the lower limit value φ min, the steps shifts to S5, and if the detected value is less than the lower limit value φ min, the step shifts to S6 (S4).

In S6, if the detected light quantity is at or above the lower limit value φ min of proper light quantity, a decision is made as to whether or not the light quantity in at least a predetermined proportion of the area of the image is within a range of proper light quantity. If the light quantity is less than the predetermined proportion of proper light quantity, the step shifts to 56, and if the light quantity is at or above the predetermined proportion, the step shifts to S8 (S5).

If the detected light quantity in the above step S4 is less than the lower limit value φ min of proper light quantity or if only a part of the image of the object is within a range of proper light quantity in the above step S5, a strobe light emission quantity which makes the detected light quantity to be a proper light quantity is determined (S6). A light quantity control signal for main light emission for effecting a light emission based on a determined light quantity value is sent to the strobe light emitter 11 to make it carry out the main light emission. Thus, the circumferential light quantity is compensated (S7).

The controller 20 controls to read out stroboscopically picked-up image data that has been picked up at the time of the pre-light emission in step S2 or at the time of the main light emission in step S7, signal-processed and stored in the image buffer of the DRAM 14, and to carry out data compression and writing to the flash memory 51 (S8).

Embodiment 1-2

The present embodiment has the pre-light emission indicating unit 112 in the stroboscopic image pickup unit 110 in FIG. 3 in such a structure that when the shutter button 37 has been depressed, the pre-light emission indicating unit 112 sends a light emission quantity control signal for effecting a strobe light emission with a larger pre-light emission quantity than the main light emission quantity, to the strobe light emitter 11.

Figure 7A:
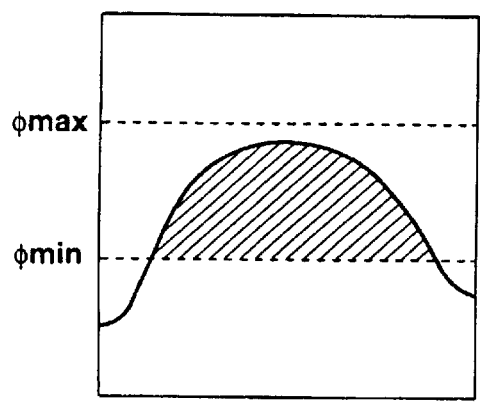
FIGS. 7A to 7D are explanatory diagrams for showing examples of light quantity distribution according to a stroboscopic image pickup.
Figure 7B:
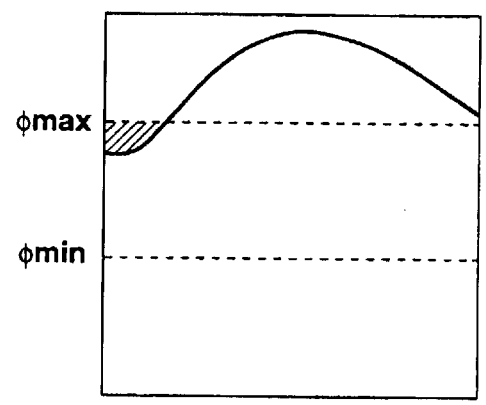
Figure 7C:
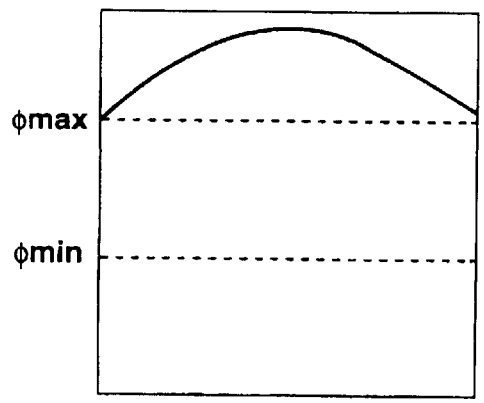
Figure 7D:
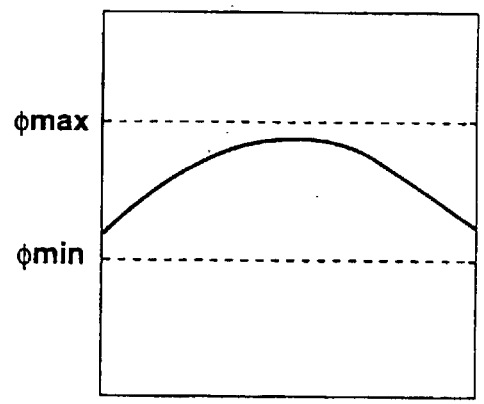

FIGS. 7A to 7D illustrate an explanatory diagram for showing an example of light quantity distribution according to a stroboscopic image pickup based on the example of the object in FIG. 4. FIG. 7A shows an example of a case where at least a predetermined proportion of the image is within a range of proper light quantity, FIG. 7B shows an example of a case where a part of the image is within a range of proper light quantity but a major part of the image exceeds the proper light quantity, FIG. 7C shows an example of a case where the whole image exceeds the proper light quantity, and FIG. 7D shows an example of a case where the light quantity increment $\Delta Y''$ calculated by the proper light quantity determining unit 114 is deducted from the example of FIG. 7C and the whole image is accommodated within a range of proper light quantity.

According to the present embodiment, in the stroboscopic image pickup unit 110 shown in FIG. 3, the light quantity determining unit 113 determines whether a light quantity detected value of an image of an object taken in at the time of a pre-light emission is within a range of proper values (within a range from a lower limit $\phi$ min to an upper limit $\phi$ max of proper light quantity (FIG. 7A). If the light quantity values in all the areas of the image exceeds the upper limit $\phi$ max (FIG. 7C) or if the light quantity in at least a predetermined proportion of the area of the image is not within the range of proper values (FIG. 7B), the proper light quantity determining unit 114 is used next. If the light quantity in at least a predetermined proportion of the area of the image is within the range of proper values (within the range from the lower limit $\phi$ min to the upper limit $\phi$ max), the image recording indicating unit 116 is used next.

When the light quantity determining unit 113 has determined that the light quantity of the object at the time of the pre-light emission exceeds the upper limit $\phi$ max (FIG. 7C) or the light quantity in at least a predetermined proportion of the area of the image is not within the range of proper values, the proper light quantity determining unit 114 determines a light quantity value so that the light quantity in at least a predetermined proportion of the area of the image becomes within a range of proper light quantity, and the step shifts to the main light emission indicating unit 115.

As an example of the determining method, when a width of one sheet covering an image is W, in the case where a light quantity y in the range of w1 to w2 in FIG. 5A is within a range of proper values, a total light quantity Y is given as follows:

$$Y = \int_{w1}^{w2} y\, dy$$

Accordingly, if the light quantity exceeds an optimum value like FIGS. 7B and 7C, w1 and w2 are determined to have a relationship of $\phi$ min<Y<$\phi$ max when a maximum value in the obtained light quantity is Y1. An increment (=a decrement=a minus increment) of the maximum value Y1 in this case, that is, a difference between Y1−Y=$\Delta Y''$ and a light emission light quantity $\Delta Y'$ at the time of pre-light emission ($\Delta Y=\Delta Y'-\Delta Y''$) becomes the light quantity to be given to the strobe light emitter 11 when the main light emission indication is given.

The operation flowchart is obtained by changing the steps S4 to S6 as follows.

In step S4 of FIG. 6, the light quantity detected value is compared with the upper limit value $\phi$ max of proper light quantity. If the maximum detected light quantity is equal to or less than the upper limit $\phi$ max, the step shifts to S5, and if the detected value exceeds the upper limit $\phi$ max, the step shifts to S6 (S4).

In step S4, if the detected light quantity is equal to or less than the upper limit $\phi$ max of proper light quantity, a determination is made as to whether or not the light quantity in at least a predetermined proportion of the area of the image is within a range of proper light quantity. If the light quantity is less than the predetermined proportion of proper light quantity, the step shifts to S6, and if the light quantity is at or above the predetermined proportion, the step shifts to S8 (S5).

If the detected light quantity in the above step S4 is equal to or less than the upper limit value $\phi$ max of proper light quantity or if only a part of the image of the object is within a range of proper light quantity in the above step S5, a light emission quantity which makes the detected light quantity to be a proper light quantity is determined (S6).

In the above-described embodiment 1-1 and the embodiment 1-2, if the light quantity of an image of an object picked up by the pre-light emission is within a range of proper light quantity, the image obtained by the pre-light emission is recorded. Therefore, it is not necessary to carry out a main light emission in this case, which achieves a longer life of the battery.

Embodiment 2-1

According to the present embodiment, the light quantity of a pre-light emission is determined based on a pre-obtained distance between a camera and a center object. The pre-light emission is carried out on this basis, and if the light quantity of the object by the pre-light emission is proper, the data of the picked-up image is recorded. In this case, a distance from the center object which is most optimum is obtained in advance, and the pre-light emission is carried out based on this distance.

[Stroboscopic Image Pickup Unit]

When a user has depressed a strobe setting button 36, a stroboscopic image pickup unit 110' is started and executes a stroboscopic image pickup processing and a recording/storage processing.

Figure 8:
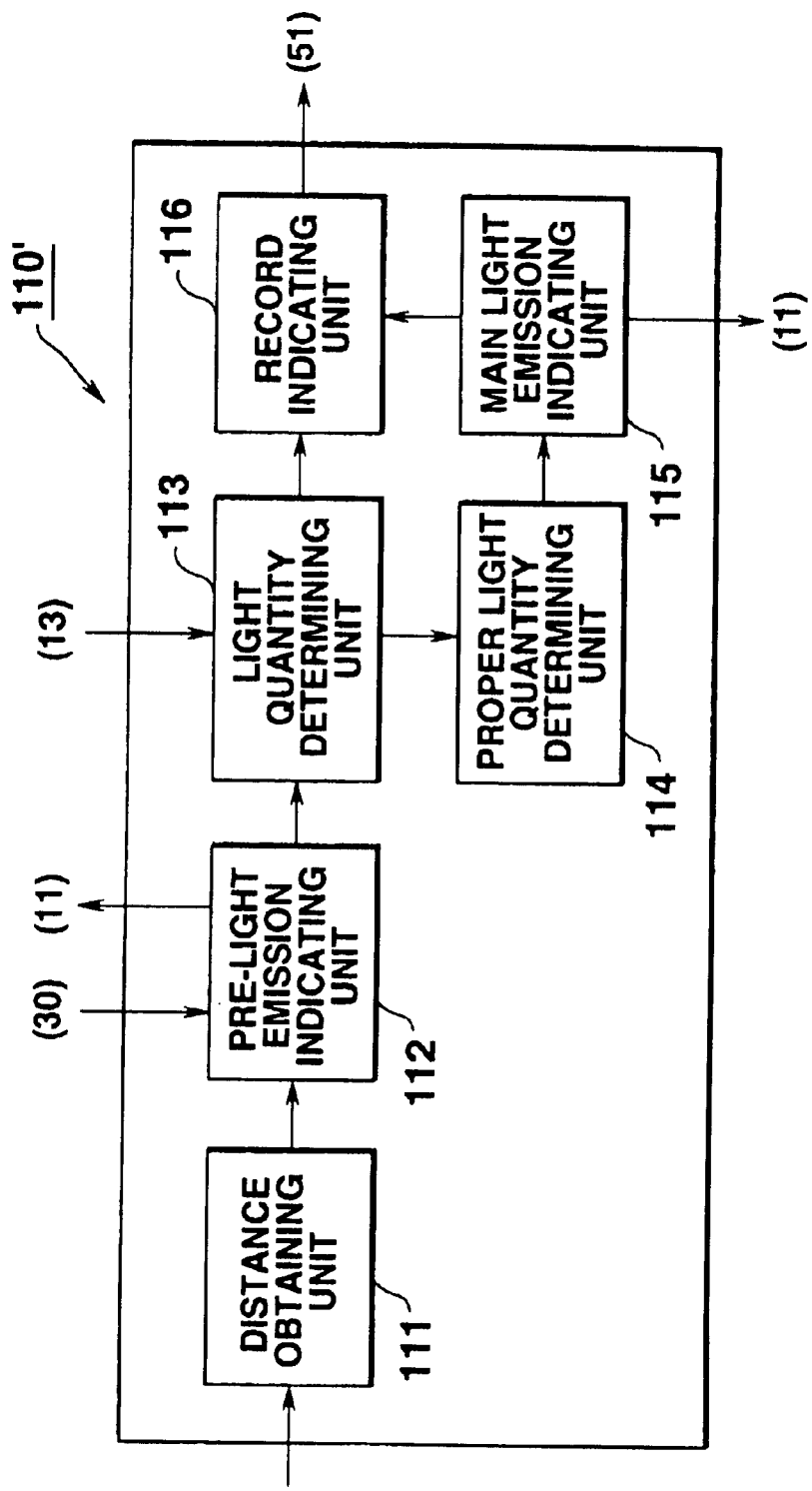
FIG. 8 is a block diagram for showing an example of the configuration of a stroboscopic image pickup device.

FIG. 8 is a block diagram for showing an example of the configuration of the stroboscopic image pickup unit 110'. The stroboscopic image pickup unit 110' includes a distance obtaining unit 111, a pre-light emission indicating unit 112, a light quantity determining unit 113, a proper light quantity determining unit 114, a main light emission indicating unit 115 and a recording indicating unit 116. The structures and functions of the pre-light emission indicating unit 112, the light quantity determining unit 113, the proper light quantity determining unit 114, the main light emission indicating unit 115 and the recording indicating unit 116 are similar to those of embodiment 1-1 (FIG. 3) or embodiment 1-2.

The distance obtaining unit 111 obtains a distance R determined in advance as a distance which ensures a most proper picking up of a center image. The distance R determines an optimum pre-light emission quantity.

[Example of Operation]

Figure 9:
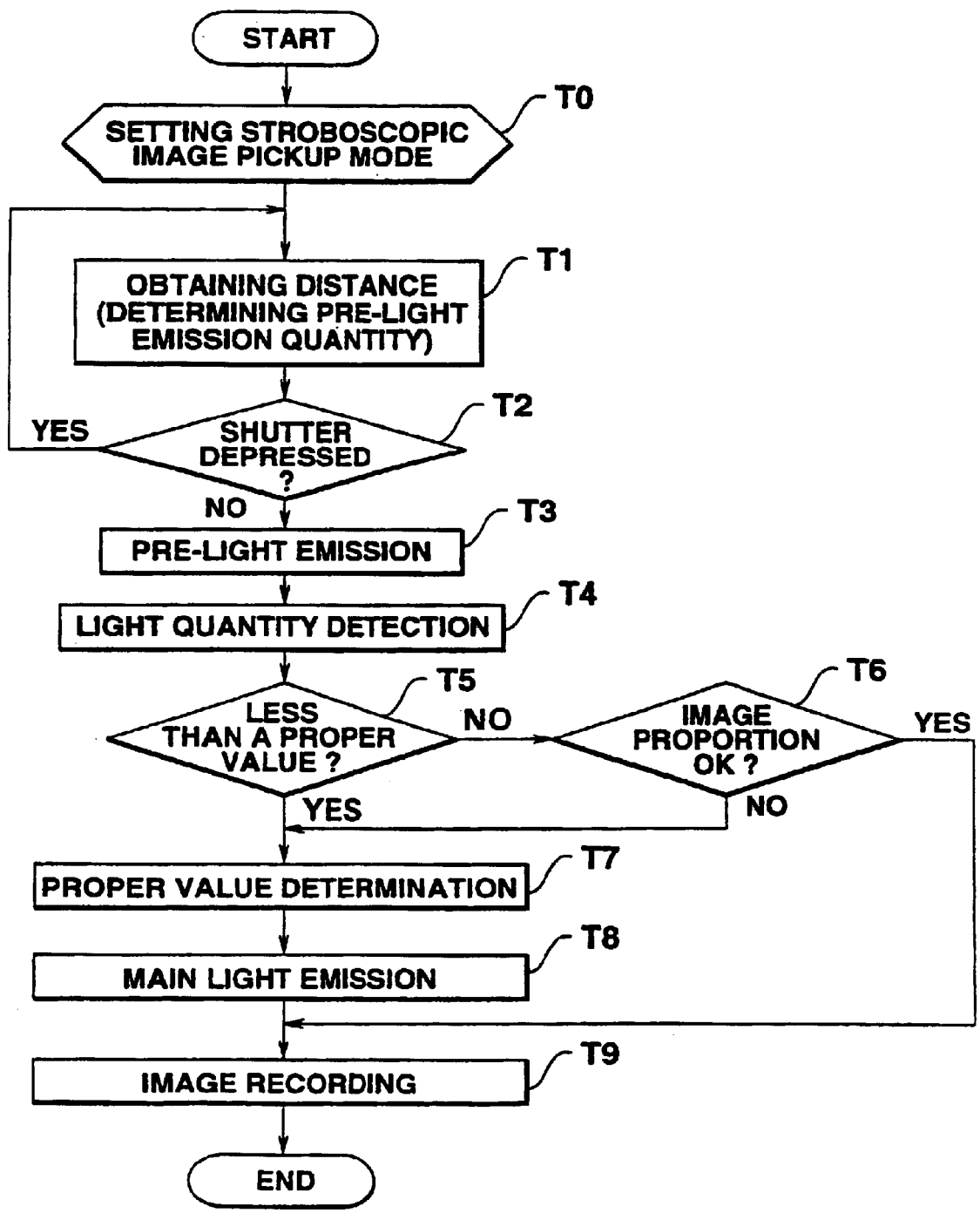
FIG. 9 is a flowchart for showing an example of the operation of a digital camera having a structure for carrying out a pre-light emission based on a distance.

FIG. 9 is a flowchart for showing an example of an operation of a digital camera structured to carry out a pre-light emission based on a set distance to an object. The operation in step T2 afterwards is the same as the operation of the step S1 afterwards in FIG. 6.

In FIG. 9, when the REC mode has been selected, the mode shifts to the image pickup mode and a through image is displayed in the finder 40. In this case, if a user decides from the brightness of the circumference that a stroboscopic image pickup is necessary or if the user desires a stroboscopic image pickup judging from the brightness of the screen by looking at the finder 40, the user depresses the strobe setting button 36. Then, the stroboscopic image pickup unit 110' is started and the strobe display lamp 35 is turned on, and the step goes to T1. The strobe display lamp 35 is turned on in red color in a strobe charged status, and is turned on in blue color in a strobe light emittable status. When the strobe setting button 36 is depressed again, the strobe display lamp 35 is turned off, and the processing by the stroboscopic image pickup/recording unit 110' is stopped to return to the normal image pickup mode (T0).

Next, the controller 20 obtains a distance R which has been determined as a distance (object distance) at which an image of a center object can be picked up in best condition, and then the controller determines an optimum pre-light emission quantity based on this distance R (T1).

The controller 20 checks a status signal from the console 30, and when the user has depressed the shutter button 37 at a subsequent desired timing (T2), the controller 20 determines a pre-light emission quantity which is optimum at the distance R and sends a light quantity control signal to the strobe light emitter 11 to make it carry out the pre-light emission to compensate the circumferential light quantity (T3). Subsequent steps T4 to T9 are similar to those of the steps S3 to S8 in FIG. 6.

Embodiment 2-2

According to the present embodiment, the light quantity of a pre-light emission is determined based on a pre-obtained distance between a camera and a center object. The pre-light emission is carried out on this basis, and if the light quantity of the object by the pre-light emission is proper, the data of the picked-up image is recorded. In this case, a pre-light emission is carried out based on a distance obtained by an auto-focussing operation.

In the present embodiment, the digital camera 100 of the circuit structure in FIG. 1 has an auto-focussing mechanism. In the stroboscopic image pickup unit 110', the distance obtaining unit 111 obtains the distance R by an automatic focussing operation, and determines a pre-light emission quantity which is optimum at the distance R.

It can be so arranged that the distance R can be changed manually, that is, the pre-light emission quantity can be changed to a desired light emission quantity.

The structures and functions of the pre-light emission indicating unit 112, the light quantity determining unit 113, the proper light quantity determining unit 114, the main light-emission indicating unit 115 and the recording indicating unit 116 are similar to those of embodiment 1-1 (FIG. 3) or embodiment 1-2.

[Example of Operation]

Figure 10:
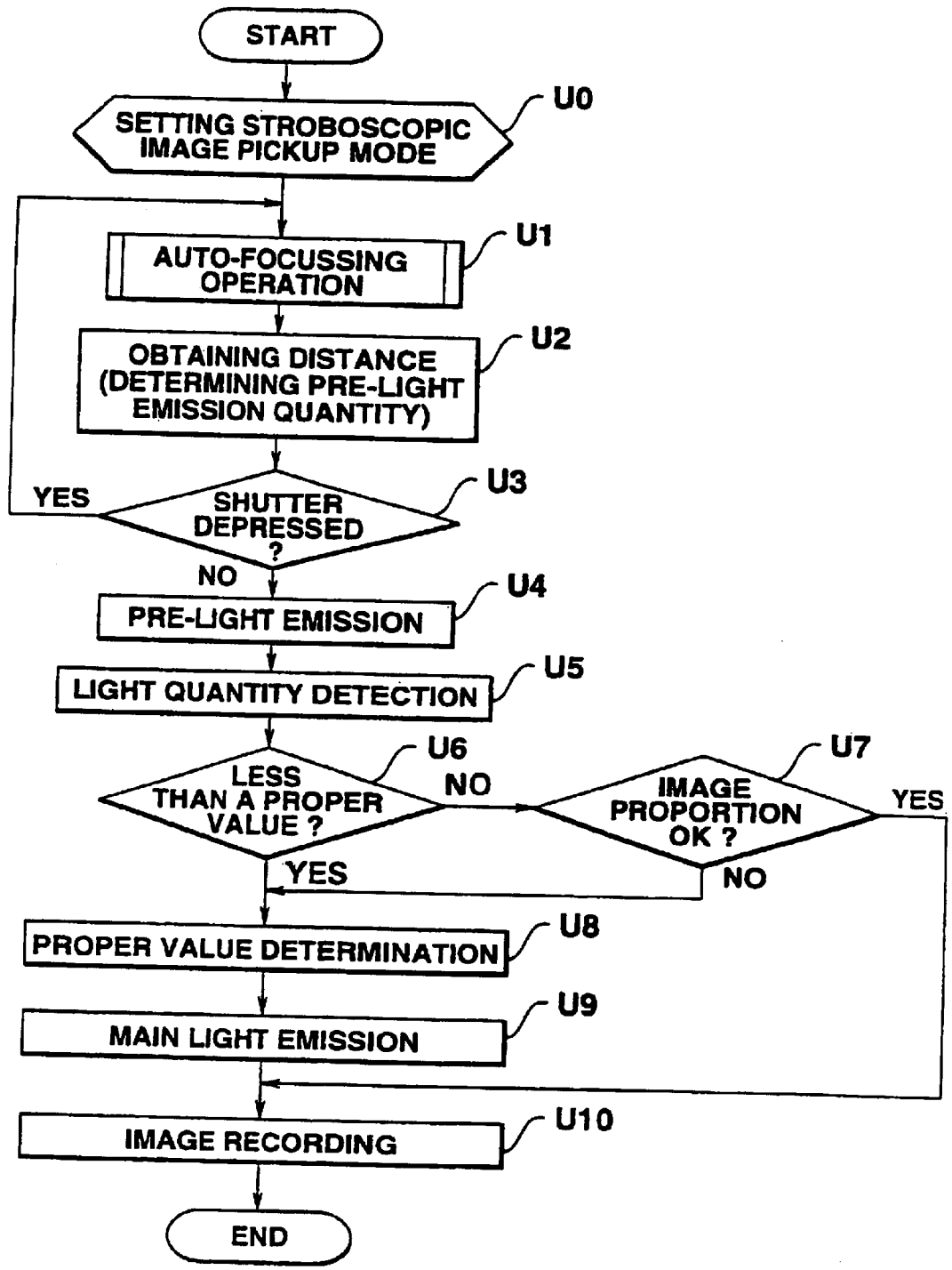
FIG. 10 is a flowchart for showing an example of the operation of a digital camera having a structure for carrying out a pre-light emission based on a distance obtained by an auto-focussing operation.

FIG. 10 is a flowchart for showing an example of an operation of a digital camera structured to carry out a pre-light emission based on a distance from an image pickup object obtained by an auto-focussing operation. The operation in step U3 afterwards is the same as the operation of the step S1 afterwards in FIG. 6.

In FIG. 10, when the REC mode has been selected, the mode shifts to the image pickup mode and a through image is displayed in the finder 40. In this case, if a user decides from the brightness of the circumference that a stroboscopic image pickup is necessary or if the user desires a stroboscopic image pickup judging from the brightness of the screen by looking at the finder 40, the user depresses the strobe setting-button 36.

Then, the stroboscopic image pickup unit 110', is started and the strobe display lamp 35 is turned on, and the step goes to U1. The strobe display lamp 35 is turned on in red color in a strobe charged status, and is turned on in blue color in a strobe light emittable status. When the strobe setting button 36 is depressed again, the strobe display lamp 35 is turned off, and the processing by the stroboscopic image pickup/recording unit 110' is stopped to return to the normal image pickup mode (U0).

During this period, the controller 20 operates the auto-focussing mechanism to carry out a focussing operation (U1) and obtains a distance R from the focussed object. The light quantity which is optimum at this distance R is determined as the pre-light emission quantity (U2).

The controller 20 checks a status signal from the console 30, and when the user has depressed the shutter button 37 at a subsequent desired timing (U3), the controller 20 determines a pre-light emission quantity which is optimum at the distance R and sends a light quantity control signal to the strobe light emitter 11 to make it carry out the pre-light emission to compensate the circumferential light quantity (U4). Subsequent steps U5 to U10 are similar to those of the steps S3 to S8 in FIG. 6.

In the above-described embodiment 2-2, the light quantity for pre-light emission is determined based on a distance from the focussed object obtained by an auto-focussing operation, and the image obtained by the pre-light emission is recorded when the light quantity of the object is within a range of proper light quantity. Therefore, the main light emission is not necessary in more cases than in embodiment 2-1. Accordingly, life of the battery can be made longer.

In the above embodiments, description has been made of the case where the present invention is applied to a digital camera of the structure for normally taking in an image of an object and displaying it in an electronic finder. However, the invention can also be applied to a digital camera of the structure using an optical finder, for example. However, in this case, it is necessary to take in or pickup an image of the object in simultaneous with the strobe light emission in the steps S2 and S7 in FIG. 6.

Although description has been made of various embodiments of the case where a digital camera is taken up as one application example, it is needless to mention that the application of the present invention is not limited to the digital camera but the invention can also be applied to various other devices equipped with an image pickup unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image pickup device equipped with a light emitter which determines a light quantity of a second light emission by the light emitter based on an electric signal into which an image picked up with a first light emission by the light emitter is converted, comprising:

an image pickup unit which picks up an image and converts the picked-up image into an electric signal;

a memory adapted to store image data corresponding to the electric signal produced by the image pickup unit;

a determining section which makes a determination of whether the electric signal produced by the image pickup unit has a proper brightness, in a case where the image is picked up by the image pickup unit with the first light emission by the light emitter; and a controller which controls the memory to store the image data corresponding to the electric signal used by the determining section for making the determination, and which inhibits the second light emission by the light emitter, only if a result of the determination of the determining section is "proper" with respect to the electric signal which is produced by the image pickup unit by converting the image picked up by the image pickup unit with the first light emission by the light emitter;

wherein the light emitter is controlled by the controller to emit light in timing with an image pickup timing of the image pickup device.

2. An image pickup device according to claim 1, wherein when the result of the determination of the determining section is "not proper", the controller determines a light quantity for the second light emission which is assumed to be "proper" based on the electric signal produced by the image pickup unit, dispatches an image pickup instruction again to the image pickup unit, and at the same time, controls the light emitter to emit the second light emission, a quantity of which is equivalent to the light quantity determined by the controller, in timing with the image pickup timing.

3. An image pickup device according to claim 1, wherein the controller prohibits storing in the memory of the electric signal produced by the image pickup unit when the result of the determination of the determining section is "not proper".

4. An image pickup device according to claim 3, wherein when an electric signal produced by the image pickup unit in timing with the first light emission of the light emitter is "not proper", the controller controls the memory to store electric signals converted by the image pickup unit in timing with the second light emission and subsequent light emissions of the light emitter.

5. An image pickup device equipped with a stroboscopic light emitter, comprising:

an image pickup unit which picks up an image of an object and converts the image into an electric signal;

a memory adapted to store image data corresponding to the electric signal produced by the image pickup unit;

a determining section in a CPU which makes a determination of whether the electric signal produced by the image pickup unit is a proper image, in a case where the image is picked up by the image pickup unit with light emitted from the stroboscopic light emitter, and wherein the stroboscopic light emitter emits light of a desired intensity in synchronism with an operation of the image pickup unit; and a controller in the CPU which controls the memory to store the image data corresponding to the electric signal used by the determining section for the determination if a result of the determination of the determining section is "proper" with respect to the electric signal which is produced by the image pickup unit by converting the image picked up thereby with the light emitted from the stroboscopic light emitter, and which computes an intensity of the light emitted from the stroboscopic light emitter if the result of the determination of the determining section is "not proper", wherein the intensity of light is based on the electric signal used by the determination section for the determination and is estimated to enable the result of the determination to become "proper", and wherein the controller again instructs the image pickup unit to pick up an image and also instructs the stroboscopic light emitter to emit light in synchronism with the image pickup operation of the image pickup unit.

6. An image pickup device equipped with a light emitter, comprising:

an image pickup unit which picks-up an image and converts the picked-up image into an electric signal;

a memory adapted to store image data corresponding to the electric signal produced by the image pickup unit;

a determining section which makes a determination of whether the electric signal produced by the image pickup unit has a proper brightness, in a case where the image is picked up by the image pickup unit with light emitted from the light emitter;

a controller which controls the memory to store the image data corresponding to the electric signal used by the determining section for the determination with respect to the electric signal which is produced by the image pickup unit by converting the image picked up by the image pickup unit with the light emitted from the light emitter, only if a result of the determination of the determining section is "proper" wherein the light emitter is controlled by the controller to emit light in synchronism with an image pickup operation of the image pickup unit; and an auto-focussing unit for driving an optical system to focus on an object;

wherein when the result of the determination of the determining section is "not proper", the controller obtains a light quantity of the light emitter which is assumed to be "proper" based on the electric signal produced by the image pickup unit, dispatches an image pickup instruction again to the image pickup unit, and at the same time, controls the light emitter to emit light in timing with the image pickup timing.

7. An image pickup device according to claim 6, wherein the controller obtains a light emission quantity of the light emitter by referring to information of a distance to the object obtained by an auto-focussing operation of the auto-focussing unit.

8. An image pickup device according to claim 6, wherein the controller controls the light emitter to carry out a first light emission in a light emission quantity of the light emitter set by a user operation.

9. An image pickup method using a light emitter, comprising:

carrying out a first light emission of the light emitter, and carrying out a first image pickup operation in timing with the first light emission;

determining a brightness of a state of an image picked up by the first image pickup operation carried out in timing with the first light emission;

storing image data corresponding to an electric signal subjected to determination of the brightness of the state of the picked up image, if a result of the determination in the determining step is "at or above a predetermined value" with respect to the brightness of the state of the image picked up by the first image pickup operation;

determining a second light emission value of the light emitter if the result of the determination in the determining step is "less than a predetermined value" with respect to the brightness of the state of the image picked up by the first image pickup operation;

carrying out a second light emission of the light emitter based on the second light emission value, and carrying out a second image pickup in timing with the second light emission; and storing the second picked-up image.

10. An image pickup device according to claim 1, further comprising a shutter button which enables a user to instruct the image pickup device to perform an image pickup operation, and wherein the controller controls the image pickup unit to execute the image pickup operation in response to an operation of the shutter button by the user.

11. An image pickup device equipped with a light emitter, comprising:

an image pickup unit which picks up an image and converts the picked-up image into an electric signal;

a memory adapted to store image data corresponding to the electric signal produced by the image pickup unit;

a pre-emission instructing unit which instructs the light emitter to emit light in timing with a first image pickup timing of the image pickup unit;

a main emission instructing unit which instructs the light emitter to emit light in timing with a second image pickup timing of the image pickup unit;

a determining section which makes a determination of whether an electric signal which is produced by a first image pickup operation and conversion of the image pickup unit has a proper brightness, wherein the first image pickup operation of the image pickup unit is performed at a same time as the light emitter emits the light in timing with the first image pickup timing of the image pickup unit; and means for controlling the memory to store image data corresponding to an electric signal subjected to determination by the determining section, if a result of the determination by the determining section is "proper", and for controlling the memory to store image data corresponding to an electric signal which is produced by a second image pickup operation and conversion of the image pickup unit, if the result of the determination by the determining section is "not proper";

wherein the light emitter is controlled by one of the pre-emission instructing unit and the main emission instructing unit to emit light in timing with one of the first and second image pickup timings of the image pickup unit.

12. An image pickup device according to claim 11, further comprising a proper light-quantity determining section for determining, when the result of the determination by the determining section is "not proper", a quantity of light from the light emitter which is estimated to enable the result of the determination to become "proper", based on the electric signal produced by the first image pickup operation and conversion of the image pickup device, wherein the first image pickup operation is performed at the same time as the light emitter emits the light in timing with the first image pickup timing of the image pickup unit.

* * * * *